(12) United States Patent
Twaroski et al.

(10) Patent No.: US 11,054,076 B2
(45) Date of Patent: Jul. 6, 2021

(54) REINFORCING RING WITH SLEEVE

(71) Applicant: Zurn Industries, LLC, Milwaukee, WI (US)

(72) Inventors: Jacob D. Twaroski, Wattsburg, PA (US); Michael T. Benesh, Erie, PA (US)

(73) Assignee: ZURN INDUSTRIES, LLC, Milwaukee, WI (US)

( * ) Notice: Subject to any disclaimer, the term of this patent is extended or adjusted under 35 U.S.C. 154(b) by 746 days.

(21) Appl. No.: 15/801,074

(22) Filed: Nov. 1, 2017

(65) Prior Publication Data

US 2018/0128409 A1    May 10, 2018

Related U.S. Application Data

(60) Provisional application No. 62/417,593, filed on Nov. 4, 2016.

(51) Int. Cl.
| | |
|---|---|
| *F16L 47/22* | (2006.01) |
| *B32B 1/00* | (2006.01) |
| *B29C 63/44* | (2006.01) |
| *B29C 63/42* | (2006.01) |
| *B29D 23/00* | (2006.01) |
| *F16L 13/14* | (2006.01) |

(52) U.S. Cl.
CPC .............. *F16L 47/22* (2013.01); *B29C 63/42* (2013.01); *B29C 63/44* (2013.01); *B29D 23/003* (2013.01); *B32B 1/00* (2013.01); *F16L 13/147* (2013.01); *F16L 2013/145* (2013.01); *F16L 2201/10* (2013.01)

(58) Field of Classification Search
CPC ......... F16L 47/22; F16L 13/147; F16L 37/08; F16L 13/16; F16L 13/163; F16L 13/166; F16L 2201/44; B29C 63/42; B29C 63/44
See application file for complete search history.

(56) References Cited

U.S. PATENT DOCUMENTS

| | | | |
|---|---|---|---|
| 2,739,829 A | 3/1956 | Pedlow et al. | |
| 2,930,634 A | 3/1960 | Merritt | |
| 2,933,428 A | 4/1960 | Mueller | |
| 3,226,807 A * | 1/1966 | Orr ....................... | F16L 58/181 29/890.14 |
| 3,260,540 A | 7/1966 | Houot | |
| 3,291,670 A | 12/1966 | Usab | |

(Continued)

FOREIGN PATENT DOCUMENTS

| | | |
|---|---|---|
| CN | 2793501 Y | 7/2006 |
| DE | 19948597 A1 | 4/2000 |

(Continued)

*Primary Examiner* — Matthew Troutman
*Assistant Examiner* — James A Linford
(74) *Attorney, Agent, or Firm* — Michael Best & Friedrich LLP

(57) ABSTRACT

A compression collar is used for reinforcing an interference fit between a piping end and a fitting. The compression collar comprises a reinforcing ring having a tubular geometry with a radially-inward facing surface and a radially-outward facing surface. A sleeve is received around, at least in part, a portion of the radially-outward facing surface of the reinforcing ring and this sleeve wraps around one axial end of the reinforcing ring to form a stop edge thereon.

6 Claims, 5 Drawing Sheets

(56) References Cited

U.S. PATENT DOCUMENTS

| | | | |
|---|---|---|---|
| 3,567,259 A | 3/1971 | Benson et al. | |
| 3,656,783 A | 4/1972 | Reeder | |
| 3,759,553 A | 9/1973 | Carter | |
| 3,887,992 A | 6/1975 | Parmann | |
| 3,972,548 A | 8/1976 | Roseen | |
| 4,036,514 A | 7/1977 | Hannover | |
| 4,070,044 A | 1/1978 | Carrow | |
| 4,682,797 A | 7/1987 | Hildner | |
| 4,997,214 A | 3/1991 | Reese | |
| 5,099,888 A | 3/1992 | Valls, Jr. | |
| 5,145,283 A * | 9/1992 | Gowen | B65D 59/00 405/157 |
| 5,254,824 A | 10/1993 | Chamberlain et al. | |
| 5,566,708 A | 10/1996 | Hobbs, Jr. | |
| 5,735,554 A | 4/1998 | Imgam | |
| 5,744,085 A | 4/1998 | Sorberg | |
| 5,829,795 A | 11/1998 | Riesselmann | |
| 5,931,200 A | 8/1999 | Mulvey et al. | |
| 6,159,408 A | 12/2000 | Kitayama et al. | |
| 6,206,430 B1 * | 3/2001 | Pond | F16L 37/08 285/3 |
| 6,270,125 B1 | 8/2001 | Rowley et al. | |
| 6,367,850 B1 | 4/2002 | Thrift et al. | |
| 6,581,982 B1 | 6/2003 | Nghiem | |
| 6,585,297 B2 | 7/2003 | Mullen, Jr. | |
| 6,783,160 B2 | 8/2004 | Rowley | |
| 6,832,502 B1 | 12/2004 | Whyte et al. | |
| 7,128,560 B2 | 10/2006 | Tandart | |
| 7,364,206 B2 | 4/2008 | Romanelli et al. | |
| 7,370,889 B2 | 5/2008 | Maunder et al. | |
| 7,448,652 B2 | 11/2008 | Poast et al. | |
| 7,654,588 B2 | 2/2010 | Schwalm | |
| 7,744,803 B2 | 6/2010 | Jackson et al. | |
| D623,277 S | 9/2010 | Guzzoni et al. | |
| 7,922,475 B2 | 4/2011 | Gueit | |
| D637,697 S | 5/2011 | Steiner | |
| 7,959,429 B2 | 6/2011 | Munoz De Juan | |
| 8,069,699 B2 | 12/2011 | Glenn et al. | |
| 8,146,225 B2 | 4/2012 | Olinger et al. | |
| 8,211,347 B2 | 7/2012 | Tabanelli | |
| 8,302,448 B2 | 11/2012 | Woelcken et al. | |
| 8,365,382 B2 | 2/2013 | Hedstrom | |
| 8,517,715 B2 | 8/2013 | Thorson et al. | |
| 8,562,331 B2 | 10/2013 | Schramm et al. | |
| 8,745,843 B2 | 6/2014 | Michels et al. | |
| D730,494 S | 5/2015 | Arment et al. | |
| 9,248,617 B2 | 2/2016 | Lundequist et al. | |
| 9,475,965 B2 | 10/2016 | Conrad et al. | |
| 9,625,069 B2 | 4/2017 | Schwager | |
| 2003/0212180 A1 | 11/2003 | Rietz et al. | |
| 2003/0230895 A1 | 12/2003 | Brown et al. | |
| 2004/0164549 A1 * | 8/2004 | McAlpine | F16L 27/1017 285/235 |
| 2005/0161939 A1 | 7/2005 | Poll | |
| 2006/0082156 A1 | 4/2006 | Runyan | |
| 2008/0315579 A1 | 12/2008 | Smahl et al. | |
| 2009/0302602 A1 | 12/2009 | Larsson | |
| 2010/0320746 A1 * | 12/2010 | Lin | F16L 13/141 285/31 |
| 2011/0070389 A1 * | 3/2011 | Aulicino | B29C 61/0616 428/40.1 |
| 2011/0151045 A1 | 6/2011 | Gueit | |
| 2012/0153614 A1 | 6/2012 | Olinger et al. | |
| 2012/0181727 A1 | 7/2012 | Lindner et al. | |
| 2012/0211978 A1 | 8/2012 | Gardiner | |
| 2012/0217674 A1 | 8/2012 | Greding | |
| 2012/0217743 A1 | 8/2012 | Parisi | |
| 2013/0307260 A1 | 11/2013 | Laakso et al. | |
| 2014/0300107 A1 | 10/2014 | Altenrath | |
| 2014/0338178 A1 | 11/2014 | Lehmann et al. | |
| 2015/0000368 A1 | 1/2015 | Barthlein et al. | |
| 2015/0165507 A1 | 6/2015 | Reese | |
| 2015/0167874 A1 | 6/2015 | Buerli et al. | |
| 2015/0258598 A1 | 9/2015 | Frenken | |
| 2015/0306652 A1 | 10/2015 | Baerthlein et al. | |
| 2016/0008866 A1 | 1/2016 | Houle et al. | |

FOREIGN PATENT DOCUMENTS

| | | |
|---|---|---|
| EP | 0878287 A1 | 11/1998 |
| EP | 0897081 A1 | 2/1999 |
| EP | 0530387 B2 | 10/1999 |
| EP | 0728979 B1 | 5/2000 |
| EP | 1031781 A2 | 8/2000 |
| EP | 1240981 A2 | 9/2002 |
| EP | 1118401 B1 | 3/2004 |
| EP | 1326045 B1 | 2/2005 |
| EP | 1160027 B1 | 4/2005 |
| EP | 1543903 A1 | 6/2005 |
| EP | 1674241 A1 | 6/2006 |
| EP | 1837581 A2 | 9/2007 |
| EP | 1933073 A1 | 6/2008 |
| EP | 2025988 A1 | 2/2009 |
| EP | 2090384 A2 | 8/2009 |
| EP | 2090385 A2 | 8/2009 |
| EP | 2153917 A2 | 2/2010 |
| EP | 2130664 B1 | 7/2011 |
| EP | 2607764 B1 | 1/2015 |
| GB | 2352665 B | 2/2003 |
| GB | 2371253 B | 4/2004 |
| GB | 2398612 A | 8/2004 |
| WO | 9418486 A1 | 8/1994 |
| WO | 9529360 A1 | 11/1995 |
| WO | 9625255 A1 | 8/1996 |
| WO | 9841790 A1 | 9/1998 |
| WO | 0079172 A1 | 12/2000 |
| WO | 0173330 A2 | 10/2001 |
| WO | 0232597 A1 | 4/2002 |
| WO | 02077510 A1 | 10/2002 |
| WO | 03004917 A1 | 1/2003 |
| WO | 03004918 A1 | 1/2003 |
| WO | 2005046906 A1 | 5/2005 |
| WO | 2007065955 A1 | 6/2007 |
| WO | 2011128049 A1 | 10/2011 |
| WO | 2014032911 A1 | 3/2014 |
| WO | 2014075778 A1 | 5/2014 |
| WO | 2014141190 A1 | 9/2014 |
| WO | 2014177435 A1 | 11/2014 |
| WO | 2015162155 A1 | 10/2015 |

\* cited by examiner

US 11,054,076 B2

REINFORCING RING WITH SLEEVE

CROSS-REFERENCE TO RELATED APPLICATION

The present application claims priority to U.S. Provisional Patent Application No. 62/417,593, filed Nov. 4, 2016, entitled "Reinforcing Ring With Sleeve", which is hereby incorporated by reference in its entirety for all purposes.

STATEMENT OF FEDERALLY SPONSORED RESEARCH OR DEVELOPMENT

Not applicable.

BACKGROUND

This disclosure relates, in general, to improvements in cold-expansion compression collars or reinforcing rings for making leak-free tube connections for water piping. More particularly, this disclosure relates to compression collars for reinforcing cold-expansion tubing connections, such as in piping made from polyolefin, polyethylene, cross-linked polyethylene, PEX-a, PEX-b, PEX-c, PERT, or any other similar material.

Cold-expansion tubing has been used in plumbing applications for decades in Europe and now increasingly in the United States. The principle behind its operation is to manufacture a hollow, tubular material and imbue it with shape memory properties (for example, through cross-linking, irradiation, steam, and so forth) such that when the tubing is stretched or deformed, the tubing returns to the shape set in its memory during the manufacturing process after a slight temporal delay. In use, cold-expansion tubing can be widened or belled at its end and shrink back to its original shape after mere moments at room temperature. The elastic forces within the cold-expansion tubing material can be applied to any object that interferes with the cold-expansion tubing returning to its original shape. Thus, cold-expansion tubing can form interference fits or joints with fittings, other piping, and so forth.

When creating an interference fit or joint between cold-expansion tubing and a fitting, for example, it has been found that the application of an additional compression collar around the joint aids in forming and strengthening the interference fit, as noted in U.S. Pat. No. 5,735,554.

Making compression collars through extrusion of the plastic material in a tubular form has been disclosed in the prior art. In some references, the inner diameter of the tube is extruded to size and the collar is formed by cutting the tubular form to the appropriate length. In others, the entire inner diameter of the tube is smaller than the desired finished dimension and the inner diameter is machined out over a portion of the length of the collar leaving a continuous step or stop edge at one end of the collar. This stop edge or abutment rest can be used as a positioning device to position the compression collar at the end of expansion piping during installation.

U.S. Pat. No. 8,146,225 discloses a reinforcing ring made by extruding a tube of a suitable material and cutting it to length as was common in many earlier prior art references. The patent specifies that the inner diameter of the extruded tube (i.e., the tube that is cut to length to form the reinforcing ring) is smaller than the outer diameter of the tube over which the reinforcing ring is to slide or fit. The excess material, that is the material making up the difference between the inner diameter of the reinforcing ring and the outer diameter of the tube over which the reinforcing ring is to fit, is machined out of the inside of the reinforcing ring except a small amount that is left at one end to provide a stop edge or rest for positioning the reinforcing ring at the end of the tube to be reinforced. This method has disadvantages including the time required for removing excess material in a reaming or other similar process and the large amount of scrap or waste material generated that must be discarded.

U.S. Pat. No. 8,365,382 discloses a reinforcing ring made by extruding a tube, cutting the tube to length, and warming and expanding the cut tube while restraining one end to form a stop edge or rest. The warming and forming operations of this method disadvantageously add time and cost to the manufacturing process.

Therefore, a compression collar and manufacturing method are needed that save time as well as material and operation costs.

SUMMARY

The present disclosure is directed to improved compression collars or reinforcing rings for use in a cold-expansion joining system. Disclosed are compression collars and methods for manufacturing compression collars for reinforcing sealed connections between a length of piping and a plumbing fitting. Specifically, the compression collar and piping are formed from a cold-expansion material such that, when the compression collar is placed over the piping end, both the collar and end of the pipe can be expanded simultaneously, placed over a fitting, and then quickly returned to substantially the same size and shape at room temperature to form a seal between the fitting and the end of the pipe. The compressive forces of the compression collar after expansion—due to the strong elastic restorative characteristics of the cold-expansion material urging a return to the original, pre-expansion diameter—create an outstanding seal for the connection and reinforce the interference fit between the piping and the fitting.

Notably, disclosed herein is a structure for a compression collar in which a radially-extending stop edge is formed by a heat shrunk sleeve material received around the reinforcing ring. In addition to providing the stop edge for locating the compression collar on the end of a pipe, the sleeve material may irreversibly deform during cold expansion, indicating that the sleeve has been used. This deformation may be permanent and involve, at least in some form, the sleeve including perforations which are torn upon expansion of the compression collar and the sleeve that is a part thereof.

According to one aspect of the invention, a compression collar is disclosed for reinforcing an interference fit between a piping end and a fitting. The compression collar includes a reinforcing ring and a sleeve. The reinforcing ring has a tubular geometry with a radially-inward facing surface and a radially-outward facing surface. The sleeve is received around, at least in part, a portion of the radially-outward facing surface of the reinforcing ring. This sleeve wraps around one axial end of the reinforcing ring to form a stop edge on the axial end.

The sleeve and reinforcing ring may be various materials which may be similar or dissimilar from one another. In some forms, the reinforcing ring may be at least one of polyolefin, cross-linked polyolefin, polyethylene, cross-linked polyethylene, PEX, PEX-a, PEX-b, PEX-c, and PERT. The sleeve may be a polymeric material configured to shrink when exposed to heat such as, for example, PVC.

In some forms, the sleeve may have a perforation formed therein. This perforation may extend for some or all of an axial and/or radial distance along the sleeve (the axial length corresponding to a direction of extension along the sidewall of the sleeve whereas the radial length may correspond to a portion of the sleeve forming the stop edge). In one particular form, the sleeve may include two perforations positioned parallel to one another and configured to allow a portion of the sleeve to tear when the compression collar is initially expanded.

According to another aspect of the invention, a method is disclosed for manufacturing a compression collar for reinforcing an interference fit between a piping end and a fitting. A reinforcing ring is formed or provided having a tubular geometry with a radially-inward facing surface and a radially-outward facing surface from a cold-expansion material. A sleeve is placed around, at least in part, a portion of the radially-outward facing surface of the reinforcing ring such that the sleeve wraps around one axial end of the reinforcing ring to form a stop edge thereon.

In an exemplary form of this method, the method involves shrinking the sleeve around the reinforcing ring by, for example, applying heat to the sleeve as the sleeve surrounds, at least in part, the portion of the reinforcing ring. By heat shrinking a sleeve partially received over the ring (and partially not received over the ring), the stop edge may be formed by shrinking the sleeve on the axial end of the reinforcing ring to a greater degree than a remainder of the sleeve that contacts the radially-outward facing surface of the reinforcing ring.

It is contemplated that, in some forms, the reinforcing ring may be cut to a desired length. This may be the case if the formed ring material is, for example, extruded such that each ring must be cut to length.

Again, the cold-expansion material of the reinforcing ring may be at least one of polyolefin, cross-linked polyolefin, polyethylene, cross-linked polyethylene, PEX, PEX-a, PEX-b, PEX-c, and PERT. The material of the sleeve may include, for example, PVC.

According to yet another aspect of the invention, a method of using a compression collar for reinforcing an interference fit between a piping end and a fitting is disclosed. The compression collar, which includes a reinforcing ring having a tubular geometry with a radially-inward facing surface and a radially-outward facing surface and a sleeve received around, at least in part, a portion of the radially-outward facing surface of the reinforcing ring that wraps around one axial end of the reinforcing ring to form a stop edge thereon, is placed over the piping end. This compression collar is expanded by expanding the piping end and a fitting is placed within the piping end. After the compression collar recoils or returns to its original shape (or attempts to), an interference fit is established between the piping end and the fitting.

In some forms of the method, there may be perforations on the sleeve. If these perforations are torn, the tearing may indicate to a user that the compression collar has been expanded. In some specific forms, the sleeve may include two perforations positioned parallel to each other that are configured to allow a portion of the sleeve to tear when the compression collar is initially expanded. While that is one exemplary geometric arrangement of the perforations that can be indicative of circumferential expansion of the sleeve, alternative geometric arrangements of the perforations are certainly contemplated.

It should further be appreciated, as one having ordinary skill in the art will understand, that the step of expanding the piping end may, and likely will, occur when a user or installer uses a pipe expanding tool.

These and still other advantages of the invention will be apparent from the detailed description and drawings. What follows is merely a description of some preferred embodiments of the present invention. To assess the full scope of the invention, the claims should be looked to, as these preferred embodiments are not intended to be the only embodiments within the scope of the claims.

Figure 1:
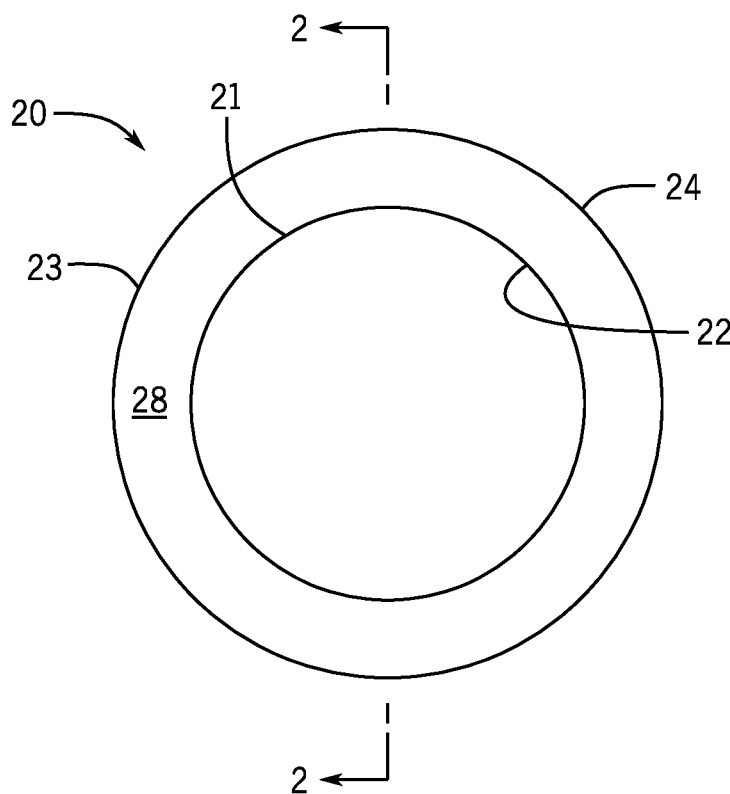
FIG. 1 is an axial end view of a reinforcing ring.

Corresponding reference characters indicate corresponding parts throughout the several views. Although the drawings represent embodiments of the present disclosure, the drawings are not necessarily to scale and certain features may be exaggerated in order to better illustrate and explain the embodiments of the present disclosure.

DETAILED DESCRIPTION

For the purposes of promoting an understanding of the principles of the present disclosure, reference will now be made to a number of illustrative embodiments shown in the attached drawings and specific language will be used to describe the same.

Figure 2:
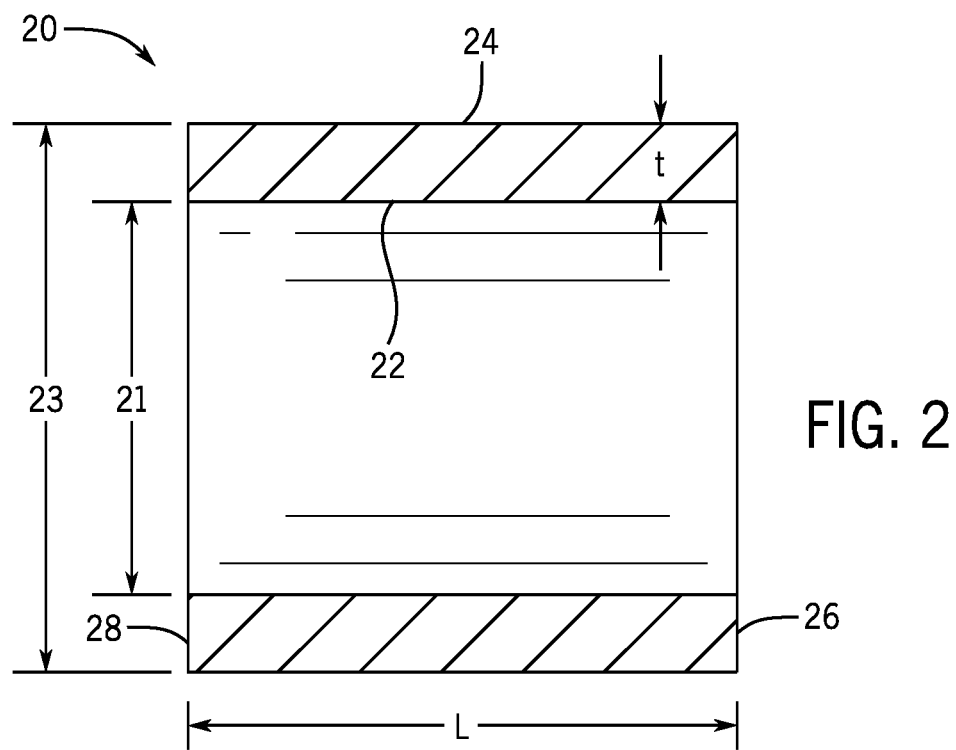
FIG. 2 is a cross-sectional side view of the reinforcing ring of FIG. 1, taken along cut line 2-2.
Figure 4:
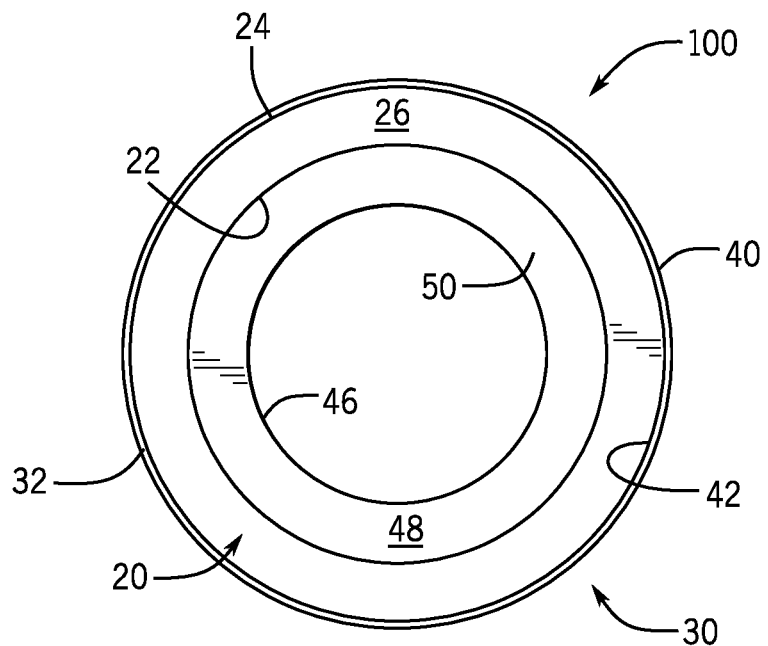
FIG. 4 is an axial end view of a compression collar including the assembled ring and sleeve.

FIGS. 1 and 2 show a reinforcing ring 20 that may be used as part of a compression collar (e.g., the compression collar 100, shown in FIG. 4). The reinforcing ring 20 may be formed from extrusion material comprising polyolefin, cross-linked polyolefin, polyethylene, cross-linked polyethylene, PEX, PEX-a, PEX-b, PEX-c, PERT, and/or any other material exhibiting memory properties such that at room temperature the material may be stretched and immediately or shortly thereafter begin shrinking back down to the material's previous shape before the stretching operation. Reinforcing rings 20 formed of material(s) having memory properties can be advantageously used to create interference or frictional fits or joints using the forces exerted by the material on any object that is larger than the material's normal shape, and over which the material is stretched, placed, and allowed to shrink. Thus, depending on the amount of stretching and the thickness of the material, strong squeezing forces exerted by the material on an object may cause the object to remain in place and resist becoming dislodged by other forces. Additionally, the flexibility of the material allows for elastic stretching rather than cracking or tearing.

The reinforcing ring 20, as seen in FIGS. 1 and 2, can have a tubular geometry, as shown. The cylindrical shape may be produced in a number of different manufacturing methods, such as for instance extrusion or injection molding.

In some embodiments, the reinforcing ring 20 can be extruded as a continuous tube (not shown), and then cut or otherwise manipulated to a desired length L. The reinforcing ring 20 can have a nominal inner diameter 21 defining a radially-inward facing surface 22 and an outer diameter 23 defining a radially-outward facing surface 24. The desired length L of the reinforcing ring may be based on the inner and outer diameters 21, 23 of the reinforcing ring 20 and/or the intended use. For example, the nominal inner diameter 21 of the reinforcing ring 20 may range from about 0.635 cm (0.25 inches) to about 15.24 cm (6 inches). The reinforcing ring 20 can then fit or slide over the outer diameter of standard cold-expansion plumbing piping for residential or commercial applications when the reinforcing ring 20 is expanded. Additionally, the reinforcing ring 20 can be certified under the ASTM 1960 standard and may be used with standard manual pipe expanders or even automatic expander power tools. For example, the M12™ 12V Cordless Lithium-Ion ProPEX® Expansion Tool by Milwaukee Electric Tool® can be used to expand the reinforcing ring 20. Similarly, the outer diameter 23 of the reinforcing ring 20 may range from about 0.794 cm (0.3125 inches) to about 30.48 cm (12 inches), or even greater. The thickness t of the reinforcing ring 20 can be chosen based on a desired seal specification, material used, tooling used for installation, or other reasons.

The reinforcing ring 20 can have a first axial end 26 and a second axial end 28. During the formation process, both ends may be identical, or can vary. In some embodiments, the reinforcing ring 20 is cut from an extruded tube. In such embodiments, the first axial end 26 may be a formed edge and the second axial end 28 may have a cut edge having a different surface quality. In some embodiments, it may be desirable to alter at least one of the first and second end 26, 28 to create a substantially flat surface. This process may include sanding, grinding, milling, lathing, or other suitable processes for removing material from a material exhibiting memory properties. However, it should be understood that any post-formation machining process is entirely optional and may be omitted.

Figure 3:
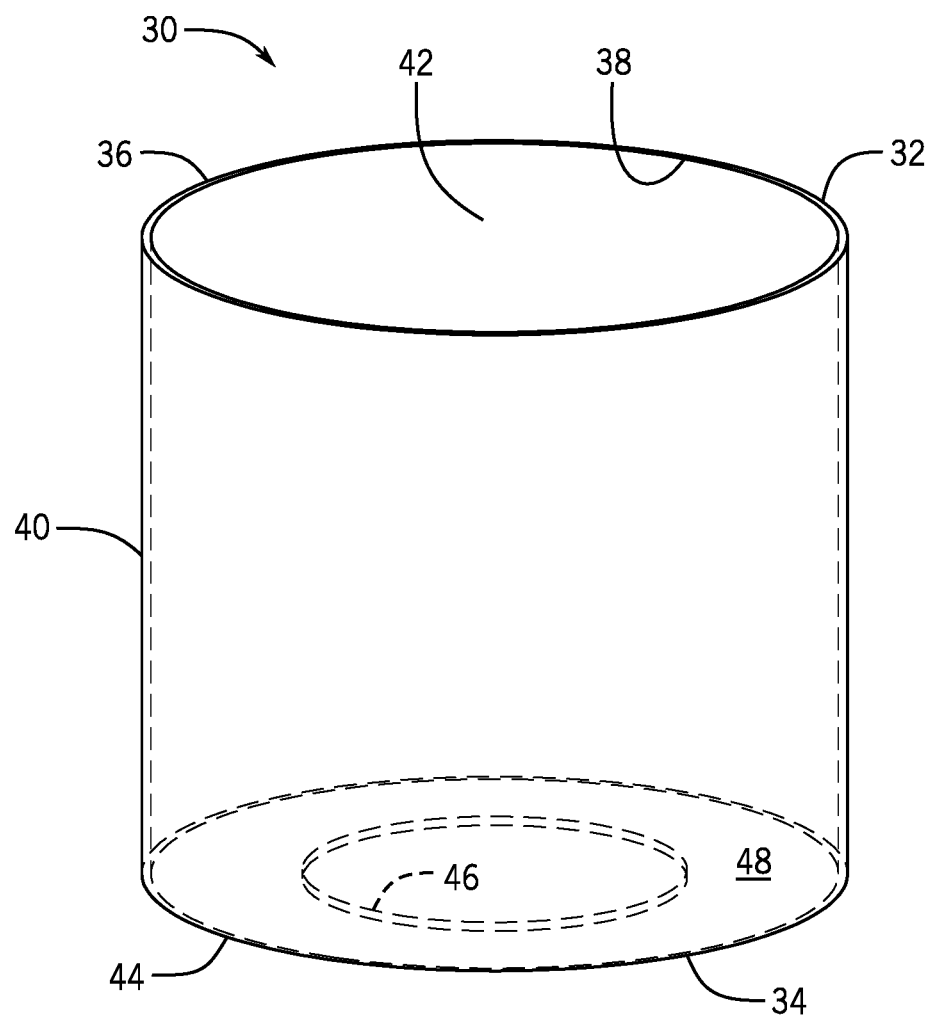
FIG. 3 is a perspective view of a sleeve.

FIG. 3 shows a sleeve 30 that can be used in conjunction with a reinforcing ring 20 to form a compression collar. In the illustrative embodiment, the sleeve 30 has a receiving end 32 and a radially inward extending seat 34. The receiving end 32 has an outer diameter 36 and an inner diameter 38. In some embodiments, the inner diameter 38 of the receiving end 32 is slightly larger than the outer diameter 23 of the reinforcing ring 20 (shown in FIGS. 1 and 2), such that at least a portion of the reinforcing ring 20 can be received within the sleeve 30. In some embodiments, the inner diameter 38 of the receiving end 32 of the sleeve 30 is about 0.127 cm (0.05 inches) larger than the outer diameter 23 of the reinforcing ring 20, or even more, such that the reinforcing ring 20 can be easily received within the sleeve 30.

A sleeve outer surface 40 and a sleeve inner surface 42 extend away from the receiving end 32 towards the seat 34. In some embodiments, the sleeve outer surface 40 and the sleeve inner surface 42 maintain a substantially constant distance from one another, such that the sleeve 30 has a constant material thickness throughout. For example, the thickness of the sleeve 30 may be between about 0.005 cm (0.002 inches) and about 1.3 cm (0.5 inches), or more preferably, about 0.008 cm (0.003 inches). However, other thicknesses may be used as well. Alternatively, the thickness may vary throughout the part. In some embodiments the seat 34 may be either thicker or thinner than other parts of the sleeve 30.

The sleeve outer surface 40 extends to the seat 34. The seat 34 has an outer diameter 44 and an inner diameter 46. In some embodiments, the seat outer diameter 44 will be substantially similar to the receiving end outer diameter 36, and may be concentric with the receiving end outer diameter 36. The seat inner diameter 46 may be smaller than the reinforcing ring inner diameter 21 (especially after the heat shrinking operation step described below which places the sleeve 30 around the ring 20). The difference between the sleeve inner surface 42 and seat inner diameter 46 creates a seat surface 48 that can be used to axially locate the sleeve 30 relative to the ends of the reinforcing ring 20 and a pipe received centrally therein. The seat surface 48 may be placed in contact with the reinforcing ring first end 26 or the second end 28, such that the axial end of the pipe and the first end 26 or second end 28 of the reinforcing ring 20 will be flush with one another.

The sleeve 30 may be comprised of a polymeric material, such as polyolefin, polyvinyl chloride (PVC), polyethylene, polypropylene, or other polymeric materials. The sleeve 30 may optionally be comprised of the same materials as the reinforcing ring 20, or may be comprised of different materials. In some embodiments, the sleeve 30 may be comprised of materials that have shrinking qualities. For example, the sleeve 30 may be comprised of a material that shrinks when it is exposed to heat, such as PVC. Also, it should be appreciated that the sleeve may be comprised of multiple materials. For example, in some embodiments, the seat 34 may be comprised of a different material than the sleeve outer surface 40 and the sleeve inner surface 42.

In view of the fact that the sleeve 30 can be formed from a heat shrinkable material, it should be appreciated that the radially inward extending portion of the sleeve 30 (e.g., the seat 34) might be formed in part or in whole as the result of differential shrinking of the sleeve precursor material over an axial end of the ring 20. Put another way, it is contemplated that the sleeve precursor material could be substantially tubular and the "seat" portion 34 could be formed only after the heat shrinking has occurred. However, it is also contemplated that the seat portion of the sleeve could be formed in the sleeve precursor material prior to heat shrinking the sleeve 30 onto the ring 20.

Figure 5:
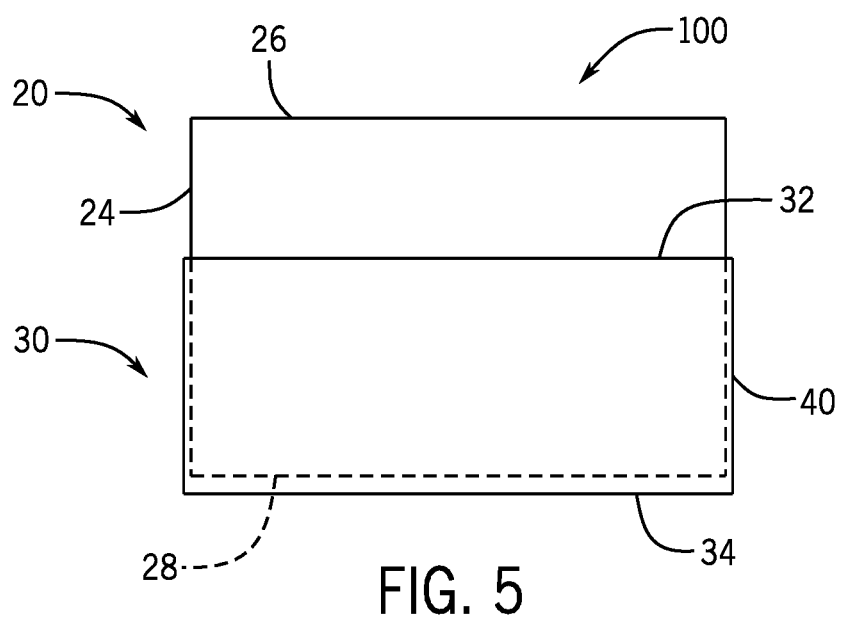
FIG. 5 is a side view of the compression collar of FIG. 4.

Turning now to FIGS. 4 and 5, a compression collar 100 is shown in which the reinforcing ring 20 is received within the sleeve 30, which has been heat shrunk therearound. The second end 28 of the reinforcing ring 20 is positioned on or adjacent to the seat surface 48, which can prevent further axial movement of the reinforcing ring 20 relative to the sleeve 30 in that axial direction. The seat surface 48 wraps around the second end 28 of the reinforcing ring 20 and extends beyond the radially-inward facing surface 22 of the reinforcing ring 20, creating a stop edge 50. The reinforcing ring 20 and the sleeve 30 may be coupled together in a number of ways, including adhesively or mechanically. However, in some embodiments, including the one illustrated, the sleeve 30 is exposed to heat. The heat shrinks the sleeve 30 around the reinforcing ring 20, bonding the sleeve 30 to the reinforcing ring 20.

In some embodiments, a portion of the reinforcing ring 20 is received within the sleeve 30. In some embodiments, the sleeve 30 may wrap around about a quarter of the reinforcing ring 20, half the reinforcing ring 20, or more. In some embodiments, the entire reinforcing ring 20 may be received within the sleeve 30. It is also contemplated that the sleeve may not comprise a full cylindrical inner surface 42. For example, in some embodiments, the sleeve may comprise a 180 degree arc instead of a full cylinder. In such embodiments, the seat 34 may comprise only a half circle commiserate with the amount of angular extension of the sleeve 30. Additionally, other arc sizes may be used and are contemplated within the scope of the present disclosure.

Figure 6:
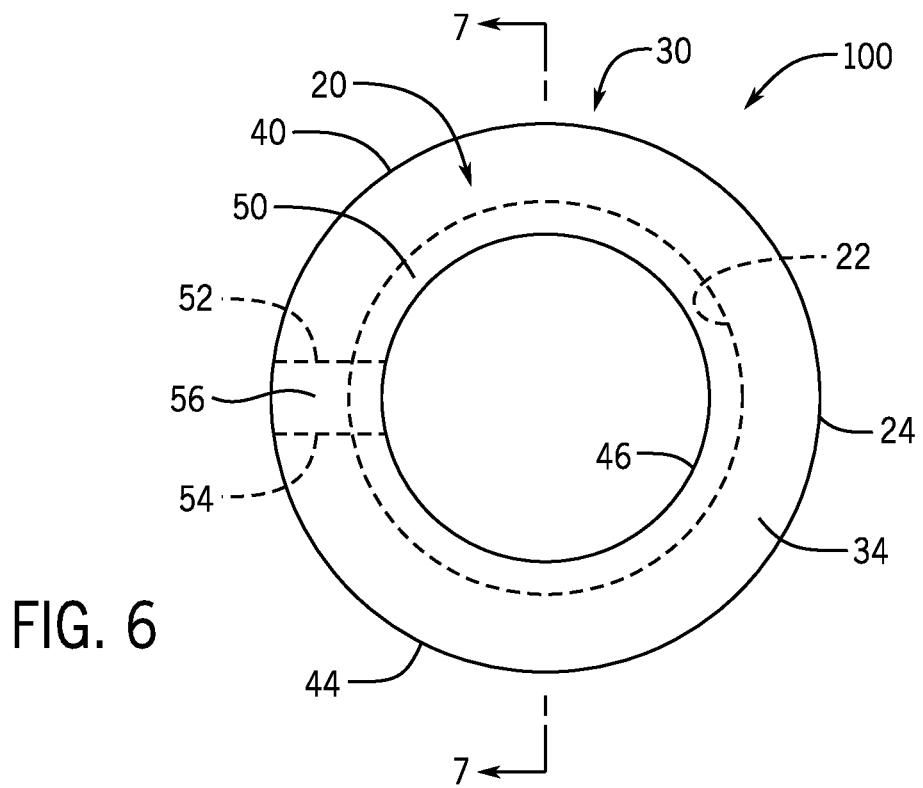
FIG. 6 is an axial end view of a compression collar taken from the opposite axial end shown in FIG. 4.
Figure 7:
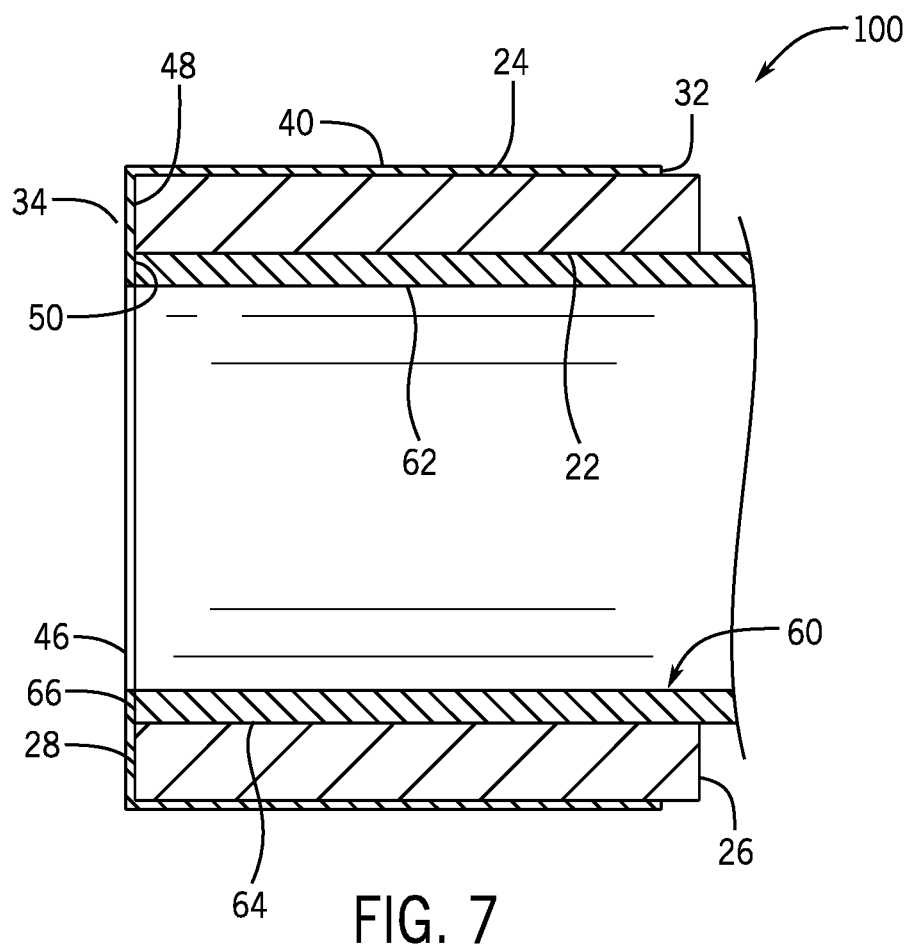
FIG. 7 is a cross-sectional view of the compression collar of FIG. 6 received over the end of a pipe.

FIGS. 6 and 7 show a compression collar 100 having a sleeve 30 that contains perforations 52 and 54. The sleeve seat 34 can have one or more perforations 52, 54 that can be used to indicate a status of the compression collar 100 or the usage state of the compression collar 100. In some embodiments, the perforation or perforations 52, 54 may be located on the sleeve outer surface 40 and the sleeve inner surface 42, and can extend from the receiving end 32 to the seat 34. In the illustrative embodiment, the sleeve seat 34 has two parallel perforations 52 and 54. Other orientations and geometries can be used, such as, for example, circumferential perforations. A single perforation line could also be used. Additionally, it is contemplated that there could be two or more perforation lines 52, 54 which may have various geometric relationships with one another. In the illustrative embodiment, the area between the perforations 52 and 54 forms an indication band 56 that can be used to determine whether or not the compression collar 100 has been previously expanded. For example, when the compression collar 100 is initially expanded, the sleeve 30 will also expand as the reinforcing ring 20 is expanded. The radial expansion of the collar 100 can cause the perforations 52 and 54 to tear, such that indication band 56 is separated from at least a portion of the seat 34. This feature can then communicate to an installer that a pipe and compression collar 100 were previously expanded. Additionally or alternatively, this design could permit for the sleeve 30 to be removed entirely from the collar 100 after the primary function of the sleeve 30 has been performed (that is, after the sleeve 30 as functioned as an axial stop for a pipe 60 on the collar 100 as the collar 100 is received over the pipe 60 and the seat 34 of the sleeve 30 has to some extent inhibited the axial translation of the collar 100 down the pipe 60 when both are cold expanded).

Still referring to FIGS. 6 and 7 and with special reference being made to FIG. 7, a stop edge 50 is illustrated. The stop edge 50 can assist in the locating of the compression collar 100 on an end 66 of a pipe 60. The sizing and location of sleeve inner diameter 46 at the stop edge 50 can be chosen such that a portion of the seat surface 48 extends radially inward beyond at least a portion of the inner diameter 21 of the reinforcing ring 20 at one of the axial ends 26, 28 of the reinforcing ring 20. The sleeve material extending radially inward beyond a portion of the inner diameter 21 of the reinforcing ring 20 forms a stop edge 50 that can then be used to prevent, or at least inhibit, the compression collar 100 from moving further axially along the pipe 60 in one direction when the collar 100 is received on an end 66 of the pipe 60. This may help in the installation process, as the compression collar 100 may be readily positioned to a desired location on a pipe end 66 by sliding the compression collar 100 over a pipe end 66 until the pipe end 66 comes into contact with the stop edge 50, as seen in FIG. 7.

The stop edge 50 can have many different orientations. In some embodiments, the stop edge 50 may not extend radially inward beyond an inner diameter 62 of the pipe end 66. In some embodiments, the stop edge 50 extends radially inward beyond the inner diameter 62 of a portion of pipe end 66. In other embodiments, the stop edge 50 may extend radially inward so that only a portion of the pipe end 66 may come into contact with the stop edge 50 when the compression collar 100 is placed over the pipe end 66.

Figure 8:
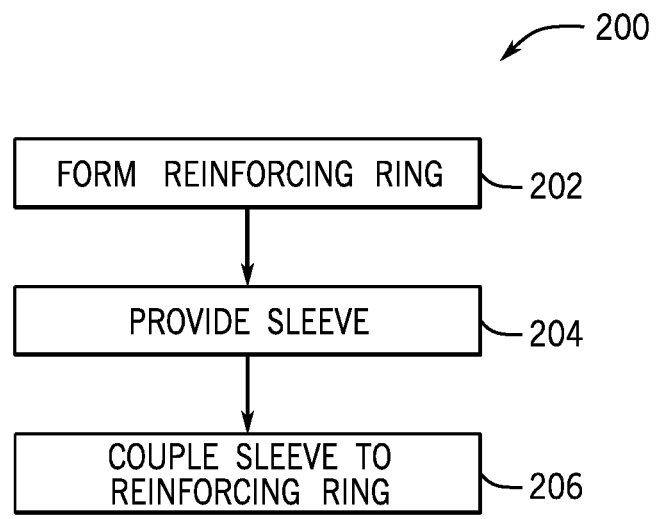
FIG. 8 is a process diagram describing an exemplary process for manufacturing a compression collar such as the compression collar illustrated in FIGS. 4-7.

Turning now to FIG. 8 with continued reference to FIGS. 1-7, a method 200 for manufacturing a compression collar, such as compression collar 100, which can reinforce an interference fit between a piping end and a fitting is provided. The method 200 may first include forming a reinforcing ring (e.g., reinforcing ring 20) from a cold expansion material according to step 202. Acceptable cold expansion materials might include polyolefin, cross-linked polyolefin, polyethylene, cross-linked polyethylene, PEX, PEX-a, PEX-b, PEX-c, PERT, and/or any other material exhibiting memory properties as discussed above. The forming process 202 may occur in a number of ways as well. In some embodiments, the reinforcing ring 20 can be formed by an extrusion process. Pipe of a desired finished inner and outer diameter may be extruded and then cut into individual reinforcing rings 20 of desirable size, through a number of cutting processes. For instance, pipe cutters could be used to cut the extruded pipe to a desired size. In other embodiments, the pipe may be molded through an injection molding process or other molding process suitable for producing reinforcing rings, such as the reinforcing ring 20 discussed above.

If the reinforcing ring 20 has been formed without an acceptable shape, one or more surfaces of the formed reinforcing ring 20 can be altered to provide a potentially desirable flat edge. Such altering processes may include sanding, grinding, milling, lathing, or other suitable processes for removing material from a material exhibiting memory properties. However, it should be understood that any post-formation machining process is entirely optional and may be omitted.

A sleeve 30 can be provided or formed at step 204, which will surround a portion of the reinforcing ring 20. The reinforcing ring 20 can be located within the sleeve 30. The sleeve 30 may be comprised of a polymeric material, such as polyolefin, polyvinyl chloride (PVC), polyethylene, polypropylene, or other polymeric materials. In some embodiments, the sleeve 30 may be comprised of materials that have shrinking qualities. For example, the sleeve 30 may be comprised of a material that shrinks when it is exposed to heat, such as PVC. Also, it should be appreciated that the sleeve 30 may be comprised of multiple materials. The sleeve may be manufactured in a number of ways as well, such as blow molding, for example.

The sleeve 30 may then be coupled to the reinforcing ring 20 at step 206. The coupling may occur in a number of ways. For example, in some embodiments, the sleeve 30 may be adhesively coupled to the reinforcing ring 20. In some embodiments, the sleeve 30 may be exposed to heat, which can cause the sleeve 30 to shrink around a portion of the reinforcing ring 20. The reinforcing ring 20 and the sleeve 30 may be exposed to heat in a number of ways. In some embodiments, the reinforcing ring 20 and the sleeve 30 may be placed in an oven, where the heat causes the sleeve 30 to shrink and tightly grasp around the reinforcing ring 20. In other embodiments, a heat gun may be used. Optionally, the process of heating a sleeve 30 comprised of a shrinking material may be performed at the location of installation.

It is contemplated that, in the most abstract way, when both the ring 20 and sleeve 30 are obtained through third parties or pre-fabricated, the method 200 may merely include the step 206 of coupling the sleeve around the reinforcing ring.

Figure 9:
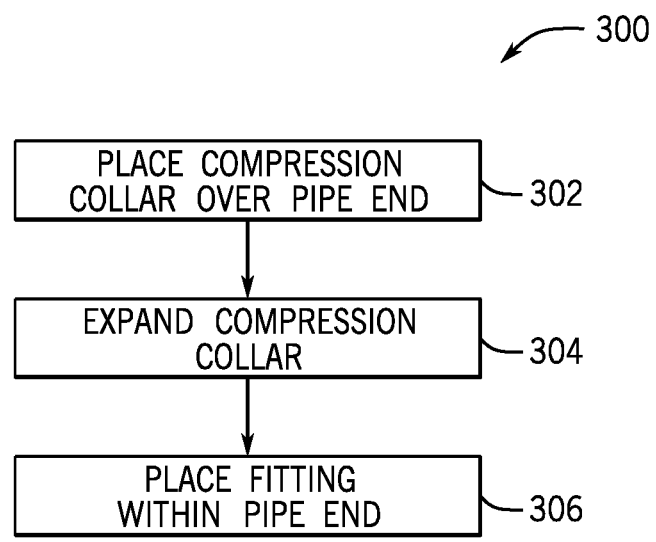
FIG. 9 is a process diagram describing the process of installing a compression collar, such as the compression collar illustrated in FIGS. 4-7.

Turning now to FIG. 9 with continued reference to FIGS. 1-7, a method 300 of installing a compression collar, such as compression collar 100, for reinforcing an interference fit between a piping end and a fitting is provided. The method 300 may first comprise placing a compression collar 100 over an end 66 of a pipe 60 at step 302. The compression collar 100 may be slid or placed over the piping end 66 until the piping end 66 comes into contact with the stop edge 50 provided by the sleeve 30 of the compression collar 100.

Once the compression collar 100 is in place over the piping end 66, the compression collar 100 may be expanded at step 304 by expanding the piping end 66. Manual or automatic pipe expanding tools may be used, such as the M12™ 12V Cordless Lithium-Ion ProPEX® Expansion Tool by Milwaukee Electric Tool®, for example.

Once the compression collar 100 has been expanded, a fitting (not shown) may be placed within the piping end at step 306. The step 306 would occur prior to the expanded pipe 60 and compression collar 100 returning to their previously unexpanded shape. The type of fitting placed within the pipe end 66 can vary, and may include any desirable fitting to be placed in communication with a piping end 66.

After the fitting is placed within the piping end 66, the piping end 66 and the compression collar 100 will attempt to return to their original shape. Assuming the fitting has a diameter greater than the relaxed inner diameter 62 of the pipe end 66, the piping end 66 is unable to return to a fully relaxed position. As the inner diameter 21 of the compression collar reinforcing ring 20 is sized to be very similar to the outer diameter 64 of the piping end 66, the inner diameter 21 of the reinforcing ring also cannot return to a fully relaxed state, and applies a constant pressure to the outer circumference of the piping end 66 to couple the pipe 60 to the fitting and form a seal (such as a water tight seal) therebetween. As such, the method creates a tight interference fit between the fitting and the piping end 66 which is further assisted by the compression collar 100 surrounding the piping end 66.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A compression collar for reinforcing an interference fit between a piping end and a fitting, the compression collar comprising: a reinforcing ring having a tubular geometry with a radially-inward facing surface and a radially-outward facing surface, the reinforcing ring configured to remain in place about the piping end after expansion of the compression collar due to expansion of the piping end; and a sleeve received around, at least in part, a portion of the radially-outward facing surface of the reinforcing ring and wrapping around one axial end of the reinforcing ring and extending radially inwardly beyond the radially-inward facing surface of the reinforcing ring to form a stop edge thereon, the sleeve including a perforation such that the sleeve is configured to tear upon expansion of the compression collar due to expansion of the piping end.

2. The compression collar of claim 1, wherein the sleeve comprises a different material than the reinforcing ring.

3. The compression collar of claim 1, wherein the sleeve comprises a polymeric material configured to shrink when exposed to heat.

4. The compression collar of claim 3, wherein the polymeric material configured to shrink when exposed to heat is PVC.

5. The compression collar of claim 1, wherein the sleeve comprises two perforations positioned parallel to one another.

6. The compression collar of claim 1, wherein the reinforcing ring is at least one of polyolefin, cross-linked polyolefin, polyethylene, cross-linked polyethylene, PEX, PEX-a, PEX-b, PEX-c, and PERT.

* * * * *